US012694334B2

(12) United States Patent
    Mishra et al.

(10) Patent No.: US 12,694,334 B2
(45) Date of Patent: Jul. 28, 2026

(54) ADAPTIVE LEARNING NETWORK SYSTEM USING LOCALIZED LEARNING TO MINIMIZE PREDICTION ERROR

(71) Applicant: Optum, Inc., Minnetonka, MN (US)

(72) Inventors: Neelabh Mishra, New Delhi (IN);
               Savindra Singh, Noida (IN)

(73) Assignee: Optum, Inc., Minnetonka, MN (US)

( * ) Notice:   Subject to any disclaimer, the term of this patent is extended or adjusted under 35 U.S.C. 154(b) by 679 days.

(21) Appl. No.: 18/088,834

(22) Filed:   Dec. 27, 2022

(65)             Prior Publication Data

US 2024/0220847 A1      Jul. 4, 2024

(51) Int. Cl.
    *G06N 20/00*      (2019.01)
    *G06F 11/34*      (2006.01)
(52) U.S. Cl.
    CPC ......... *G06N 20/00* (2019.01); *G06F 11/3452* (2013.01)
(58) Field of Classification Search
    CPC ............................. G06N 20/00; G06F 11/3452
    See application file for complete search history.

(56)             References Cited

U.S. PATENT DOCUMENTS 8,688,603 B1 *  4/2014  Kurup ..................... G06N 20/10
                                                    706/12
    10,084,805 B2   9/2018  Nadolski et al.
    10,133,250 B2  11/2018  Kohn et al.
    10,474,792 B2  11/2019  Alstad et al.

10,628,834 B1   4/2020  Agarwal et al.
    10,755,804 B2   8/2020  Katwala et al.
    10,824,958 B2  11/2020  Ramage et al.
    11,157,808 B2  10/2021  Wetta
    11,361,082 B2   6/2022  Obee et al.
    11,443,164 B2   9/2022  Dalli et al.
    2013/0054259 A1  2/2013  Wojtusiak et al.
                    (Continued)

FOREIGN PATENT DOCUMENTS

IN       202241026575 A    6/2022
    KR         20240081611 A *  6/2024  ............. G06N 20/20
                    (Continued)

OTHER PUBLICATIONS

Non-Final Rejection Mailed on Oct. 8, 2024 for U.S. Appl. No. 18/180,376, 8 page(s).
                    (Continued)

*Primary Examiner* — Casey R. Garner
(74) *Attorney, Agent, or Firm* — Alston & Bird LLP

(57)             ABSTRACT

Various embodiments of the present disclosure provide methods, apparatus, systems, computing devices, computing entities, and/or the like for i) initializing a global model with an initial probability distribution that predicts the likelihood of a target classification, and ii) continuously learning from local data sets across a plurality of edge computing entities over time by: a) generating local machine learning models based on the global machine learning model at edge computing entities, b) observing datasets via the local machine learning models, c) aggregating learnings from the local machine learning models, d) updating the global machine learning model to reflect the aggregated learnings, and e) cascading the updated model to propagate the aggregated learnings across the edge computing entities.

21 Claims, 6 Drawing Sheets

(56) References Cited

U.S. PATENT DOCUMENTS

| 2013/0332194 A1 | 12/2013 | D'Auria et al. |
| 2014/0149128 A1 | 5/2014 | Getchius |
| 2015/0039333 A1 | 2/2015 | de Traversay et al. |
| 2016/0092475 A1 | 3/2016 | Stojanovic et al. |
| 2016/0092557 A1 | 3/2016 | Stojanovic et al. |
| 2017/0017760 A1 | 1/2017 | Freese et al. |
| 2017/0270435 A1 | 9/2017 | Gallardo |
| 2018/0373844 A1 | 12/2018 | Ferrandez-Escamez et al. |
| 2019/0303719 A1* | 10/2019 | Hamilton ............ G06F 18/2113 |
| 2020/0081445 A1 | 3/2020 | Stetson et al. |
| 2020/0350072 A1 | 11/2020 | McEwing et al. |
| 2020/0356900 A1 | 11/2020 | Briancon et al. |
| 2021/0012246 A1 | 1/2021 | Hazard |
| 2021/0090694 A1 | 3/2021 | Colley et al. |
| 2021/0241204 A1 | 8/2021 | Stein |
| 2021/0287080 A1 | 9/2021 | Moloney |
| 2022/0058749 A1 | 2/2022 | Gallardo et al. |
| 2022/0335269 A1* | 10/2022 | Zhang .................... G06N 3/045 |
| 2023/0116117 A1* | 4/2023 | Shao .................... G06N 3/0464 |
| | | 706/25 |
| 2024/0005202 A1* | 1/2024 | Hasan .................... G06N 3/045 |
| 2024/0290435 A1 | 8/2024 | Desai |

FOREIGN PATENT DOCUMENTS

| WO | 2013/181564 A1 | 12/2013 | |
| WO | 2021/141744 A1 | 7/2021 | |
| WO | WO-2024031564 A1 * | 2/2024 | ............ G06N 3/084 |

OTHER PUBLICATIONS

Gopal, K. Madan. "'Building Safeguards and System Fencing Against Opportunistic Malpractice' in Ayushman Barat: Pradhan Mantri Jan Arogya Yojana (PMJAY) (National Health Protection Mission)," Technical Report, Aug. 24, 2018, (43 pages).

Notice of Allowance and Fees Due (PTOL-85) Mailed on Feb. 3, 2025 for U.S. Appl. No. 18/180,376, 10 page(s).

An, Yang, et al., "KnowAugNet: Multi-source medical knowledge augmented medication prediction network with multi-Level graph contrastive learning", submitted Apr. 28, 2022 to Cornell University Olin Online Library Archive, available on the Internet at https://arxiv.org/pdf/2204.11736, 16 pages.

Azmy, Michael, et al., "Matching Entities Across Different Knowledge Graphs with Graph Embeddings", submitted Mar. 15, 2019 to Cornell University Olin Online Library Archive, available on the Internet at https://arxiv.org/pdf/1903.06607, 5 pages.

Cronin, Robert M., et al., "Automated Classification of Consumer Health Information Needs in Patient Portal Messages", Proceedings of AMIA Annual Symposium, Nov. 5, 2015, pp. 1861-1870, available on the Internet at https://pmc.ncbi.nlm.nih.gov/articles/PMC4765690/, 10 pages.

Kirigin, Tajana Ban, et al., "Graph-Based Taxonomic Semantic Class Labeling", Future Internet, Dec. 19, 2022, 22 pages, vol. 14, No. 383, MDPI, Switzerland.

Lever, Jake, et al., "Points of Significance: Classification Evaluation", Nature Methods, Aug. 2016, pp. 603-604, No. 13, No. 8, Springer Nature, Germany.

Non-Final Rejection Mailed on Nov. 13, 2025 for U.S. Appl. No. 18/180,380, 49 page(s).

* cited by examiner

ADAPTIVE LEARNING NETWORK SYSTEM USING LOCALIZED LEARNING TO MINIMIZE PREDICTION ERROR

BACKGROUND

Various embodiments of the present disclosure address technical challenges related to performing predictive data analysis and provide solutions to address the efficiency and reliability shortcomings of existing predictive data analysis solutions.

BRIEF SUMMARY

In general, various embodiments of the present disclosure provide methods, apparatus, systems, computing devices, computing entities, and/or the like for minimizing prediction error of a global machine learning model through learnings of local instances of the global machine learning model.

In some embodiments, a computer-implemented method comprises: initializing, by a computing entity, a global machine learning model across one or more edge computing entities by deploying the global machine learning model to each of the one or more edge computing entities thereby establishing an instance of the global machine learning model as a local machine learning model at each of the one or more edge computing entities, wherein the global machine learning model has been pre-trained to generate one or more initial prediction outputs comprising an initial probability distribution representative of a likelihood of correctly predicting a target classification based on in part on data features from an initial dataset; for every iteration that a local dataset is used to fine-tune a local machine learning model associated with one of the one or more edge computing entities, the method further comprises receiving one or more local parameters associated with one or more local machine learning models, wherein i) the one or more local parameters associated with each of the one or more local machine learning models are characterized by a local posterior probability distribution associated with each of the one or more local machine learning models, and ii) the local posterior probability distribution comprises prediction output performance based on in part on data features from a local dataset at a respective edge computing entity associated with each of the one or more local machine learning models, updating the global machine learning model based on in part on the one or more local parameters, and providing the updated global machine learning model to the one or more edge computing entities, wherein the local machine learning model associated with each of the one or more edge computing entities is updated based on in part on the updated global machine learning model; and wherein each of the one or more edge computing entities is configured to: i) use the updated local machine learning model to generate a local prediction output, and ii) initiate performance of one or more prediction-based actions based on in part on the local prediction output.

In some embodiments, a computing apparatus comprising at least one processor and memory including computer program code is provided. The memory and the program code are configured to, when executed by the at least one processor, cause the computing apparatus to: initialize a global machine learning model across one or more edge computing entities by deploying the global machine learning model to each of the one or more edge computing entities thereby establishing an instance of the global machine learning model as a local machine learning model at each of the one or more edge computing entities, wherein the global machine learning model has been pre-trained to generate one or more initial prediction outputs comprising an initial probability distribution representative of a likelihood of correctly predicting a target classification based on in part on data features from an initial dataset; for every iteration that a local dataset is used to fine-tune a local machine learning model associated with one of the one or more edge computing entities, the program code further cause the computing apparatus to: receive one or more local parameters associated with one or more local machine learning models, wherein i) the one or more local parameters associated with each of the one or more local machine learning models are characterized by a local posterior probability distribution associated with each of the one or more local machine learning models, and ii) the local posterior probability distribution comprises prediction output performance based on in part on data features from a local dataset at a respective edge computing entity associated with each of the one or more local machine learning models, update the global machine learning model based on in part on the one or more local parameters, and provide the updated global machine learning model to the one or more edge computing entities, wherein the local machine learning model associated with each of the one or more edge computing entities is updated based on in part on the updated global machine learning model; and wherein each of the one or more edge computing entities is configured to: i) use the updated local machine learning model to generate a local prediction output, and ii) initiate performance of one or more prediction-based actions based on in part on the local prediction output.

In some embodiments, a computer program product comprises a non-transitory computer-readable storage medium, the non-transitory computer-readable storage medium including instructions that, when executed by a computing apparatus, cause the computing apparatus to: initialize a global machine learning model across one or more edge computing entities by deploying the global machine learning model to each of the one or more edge computing entities thereby establishing an instance of the global machine learning model as a local machine learning model at each of the one or more edge computing entities, wherein the global machine learning model has been pre-trained to generate one or more initial prediction outputs comprising an initial probability distribution representative of a likelihood of correctly predicting a target classification based on in part on data features from an initial dataset; for every iteration that a local dataset is used to fine-tune a local machine learning model associated with one of the one or more edge computing entities, the instructions further cause the computing apparatus to: receive one or more local parameters associated with one or more local machine learning models, wherein i) the one or more local parameters associated with each of the one or more local machine learning models are characterized by a local posterior probability distribution associated with each of the one or more local machine learning models, and ii) the local posterior probability distribution comprises prediction output performance based on in part on data features from a local dataset at a respective edge computing entity associated with each of the one or more local machine learning models, update the global machine learning model based on in part on the one or more local parameters, and provide the updated global machine learning model to the one or more edge computing entities, wherein the local machine learning model associated with each of the one or more edge computing entities is updated based on in part on the updated global machine learning model; and wherein each of the one or more edge computing entities is configured to: i) use the updated local machine learning model to generate a local prediction output, and ii) initiate performance of one or more prediction-based actions based on in part on the local prediction output.

DETAILED DESCRIPTION

Figure 1:
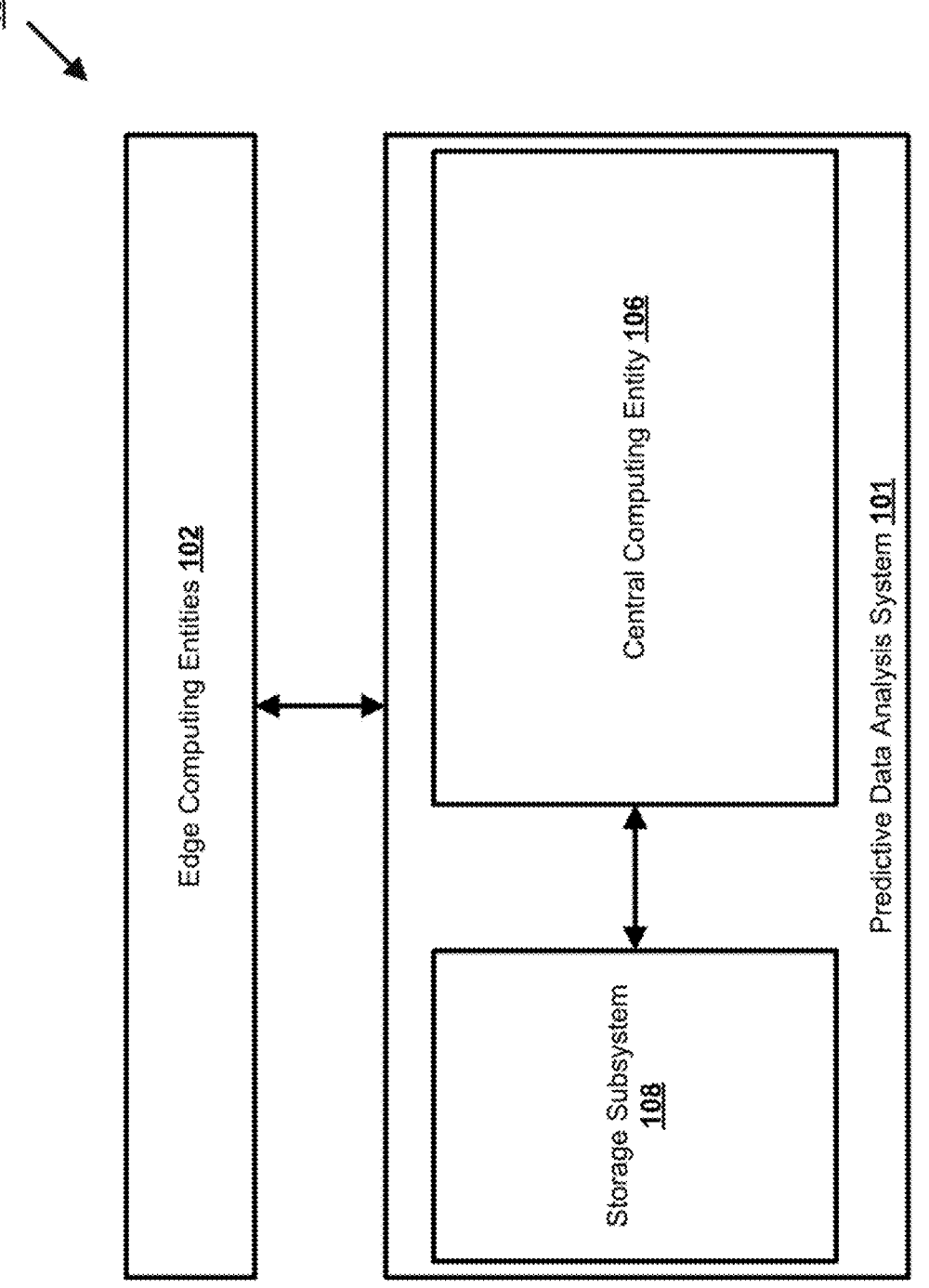
FIG. 1 provides a schematic diagram of an example architecture for optimizing predictive performance of machine learning models within an adaptive learning network in accordance with some embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. Overview, Technical Improvements, and Technical Advantages

Various embodiments of the present disclosure make important technical contributions to improving predictive accuracy of predictive machine learning models by performing continuous distributed learning on local datasets by local machine learning models and propagating the continuous distributed learnings across a network of edge computing entities without propagating data from the local datasets. This approach improves training speed and training efficiency of training predictive machine learning models. It is well-understood in the relevant art that there is typically a tradeoff between predictive accuracy and training speed, such that it is trivial to improve training speed by reducing predictive accuracy. Thus, the real challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

For example, various embodiments of the present disclosure improve predictive accuracy of predictive machine learning models by performing continuous distributed learning on local datasets by local machine learning models and propagating the continuous distributed learnings across a network of edge computing entities without propagating data from the local datasets. As described herein, conventional event prediction systems for detecting a target event are constrained to run on specific local devices having local data sources and cannot readily learn new or evolving data patterns across different devices or systems. Scaling conventional event prediction systems requires training and retraining independent machine learning models across multiple siloed data sources and is cost and time intensive due to data integrity and data policies that may restrict accessing or sharing sensitive data across different devices or systems.

However, in accordance with various embodiments of the present disclosure, a global machine learning model may be trained by aggregating local parameters from independent local machine learning models trained on local datasets to update global parameters of the global machine learning model. The global machine learning model with the updated global parameters may then be transmitted to the independent local machine learning models to propagate the collective learnings from each of the independent local machine learning models. Accordingly, embodiments of the present disclosure enable multiple edge computing devices to build a common global machine learning model without sharing data, thus allowing to address critical issues, such as data privacy, data security, data access rights, and access to heterogeneous data. In doing so, the techniques described herein reduces the amount of data transferred over a network, thus reducing the number of computational operations needed and/or the amount of training data entries needed at a central computing entity to train a global machine learning model. Accordingly, the techniques described herein improve the computational efficiency, storage-wise efficiency, and/or speed of training predictive machine learning models.

In some embodiments, the term "global machine learning model" refers to a data construct that describes parameters, hyperparameters, and/or defined operations of a machine learning model that is configured to generate initial prediction outputs. In some embodiments, a global machine learning model is pre-trained to generate one or more initial prediction outputs comprising an initial probability distribution representative of a likelihood (e.g., Bayesian) of correctly predicting a target classification based on in part on data features from an initial dataset. In some embodiments, a global machine learning model is pre-trained using supervised and/or unsupervised machine learning to predict the target classification. In some embodiments, a global machine learning model is generated, trained, and maintained (e.g., updated) by a central computing entity within an adaptive learning network. The central computing entity may be coupled to one or more edge computing entities via the adaptive learning network. In some embodiments, a global machine learning model is initialized across one or more edge computing entities by deploying a global machine learning model to each of the one or more edge computing entities, thereby establishing an instance of the global machine learning model as a local machine learning model at each of the one or more edge computing entities. In some embodiments, the global machine learning model is continuously trained based on in part on local datasets at each of one or more edge computing entities. For example, local datasets received at a given edge computing entity may be used to fine-tune a local machine learning model such that the local machine learning model may generate prediction outputs according to a local posterior probability distribution that is improved over an initial probability distribution or a global probability distribution associated with the global machine learning model. As such, a global machine learning model may be updated based on in part on the fine-tuning of one or more local machine learning models to converge on an optimal solution, minimizing prediction error over every iteration where new data from a local dataset has been learned from (e.g., by means of the fine-tuning). In some embodiments, one or more local parameters (that capture fine-tuning) of one or more local machine learning models may be received from one or more edge computing entities and used to update one or more global parameters of a global machine learning model. An updated global machine learning model may be provided (e.g., transmitted) to one or more edge computing entities, to propagate changes from the updated global machine learning model to one or more local machine learning models, thus propagating fine-tuning by each local machine learning model throughout an adaptive learning network.

In some embodiments, the term "central computing entity" refers to a node, such as a cloud computing server or a data center configured to generate, train, and maintain (e.g., via updating) a global machine learning model. In some embodiments, a central computing entity comprises a predictive data analysis system. In some embodiments, a central computing entity is coupled to one or more edge computing entities via an adaptive learning network. In some embodiments, the central computing entity is configured to initialize one or more edge computing entities by providing (e.g., transmitting) instances of a global machine learning model to the one or more edge computing entities. In some embodiments, a central computing entity is configured to collect local machine learning model learnings (e.g., fine-tuning) from one or more edge computing entities to update a global machine learning model and share the learnings across the one or more edge computing entities via transmission of the updated global machine learning model. As such, the central computing entity may perform federated or collaborative learning by training the global machine learning model through one or more edge computing entities that learn from local datasets, without having to transmit the local datasets themselves.

In some embodiments, the term "edge computing entity" refers to a node, such as a server or computing device configured to fine-tune a local machine learning model based on in part on a local dataset, and share one or more local parameters of the local machine learning model reflecting the fine-tuning with a central computing entity to improve a global machine learning model that may be shared with each edge computing entity within an adaptive learning network. In some embodiments, an edge computing entity is configured to receive an instance of a global machine learning model from a central computing entity, fine-tune a local machine learning model based on in part on a local dataset, and transmit one or more local parameters associated with the local machine learning model to the central computing entity. In some embodiments, an edge computing entity is configured to receive an updated global machine learning model that has been updated based on in part on fine-tuning of one or more local machine learning models associated with one or more edge computing entities within an adaptive learning network, and update a local machine learning model associated with the edge computing entity based on in part on the updated global machine learning model.

In some embodiments, the term "target classification" refers to a data construct that describes a desired classification or prediction of features by a machine learning model. A machine learning model may be trained to generate prediction outputs comprising a target classification by learning features from a training dataset comprising examples of features associated with the target classification. As an example, a target classification may be representative of an event, and based on training data comprising examples of the event, a machine learning model may be configured to generate prediction outputs indicative of the occurrence of the event given a prediction dataset.

In some embodiments, the term "initial prediction output" refers to a data construct that describes an output generated by a global machine learning model comprising a prediction of a target classification from a prediction dataset. An initial prediction output may comprise a prediction accuracy characterized by an initial probability distribution associated with a global machine learning model.

In some embodiments, the term "probability distribution" refers to a data construct that describes a prediction output performance of a machine learning model. In some embodiments, a probability distribution comprises a mathematical function that provides a plurality of probabilities of occurrence of an event associated with a target classification. In some embodiments, a probability distribution represents a likelihood of a machine learning model correctly predicting a target classification. In some embodiments, a probability distribution characterize one or more parameters of a machine learning model.

In some embodiments, the term "initial probability distribution" refers to a data construct that describes a prediction output performance of a pre-trained global machine learning model based on in part on an initial dataset. For example, an initial probability distribution may comprise a probability distribution of a global machine learning model prior to updating based on in part on one or more local parameters associated with one or more local machine learning models. In some embodiments, an initial probability distribution comprise either a parametric distribution or a non-parametric distribution.

In some embodiments, the term "global probability distribution" refers to a data construct that describes a prediction output performance of a global machine learning model. Generally, a global probability distribution may represent a likelihood of a global machine learning model correctly predicting a target classification and characterize one or more global parameters of the global machine learning model.

In some embodiments, the term "global parameter" refers to a data construct that describes a configuration variable used by a global machine learning model to generate prediction outputs. In some embodiments, a global parameter comprises a value or function that can be learned from training data by a global machine learning model by determining a mapping between input features from an initial dataset and a target classification. For example, a global parameter may comprise a weight or bias associated with a global machine learning model. In some embodiments, a global parameter is characterized by a global probability distribution associated with a global machine learning model. In some embodiments, a global parameter is updated by aggregating local parameters of local machine learning models. In some embodiments, a global machine learning model is updated by updating global parameters associated with the global machine learning model based on in part on one or more local parameters associated with one or more local machine learning models received from one or more edge computing entities of an adaptive learning network.

In some embodiments, the term "local machine learning model" refers to a data construct that describes parameters, hyperparameters, and/or defined operations of a machine learning model that is configured to generate a local prediction output. In some embodiments, a local machine learning model comprises an instance of a global machine learning model deployed to an edge computing entity from a central computing entity via an adaptive learning network. In some embodiments, a local machine learning model comprises one or more local parameters that are characterized by a local posterior probability distribution. In some embodiment, each local machine learning model is independently fine-tuned with a local dataset at a given edge computing entity such that the local machine learning model may generate local prediction outputs according to a local posterior probability distribution that is improved over an initial probability distribution or a global probability distribution. As such, one or more fine-tuned local machine learning models associated with one or more edge computing entities coupled to a central computing entity via an adaptive learning network may be used by the central computing entity to update a global machine learning model. Accordingly, a global machine learning model may assimilate local parameters from one or more local machine learning models to converge on an optimal solution, minimizing prediction error over every iteration when a local machine learning model performs fine-tuning based on in part on a local dataset at a respective edge computing entity.

In some embodiments, the term "local parameter" refers to a data construct that describes a configuration variable used by a local machine learning model to generate local prediction outputs. In some embodiments, a local parameter comprises a value or function that can be learned from training data by a local machine learning model by determining a mapping between input features from a local dataset and a target classification. For example, a local parameter may comprise a weight or bias associated with a local machine learning model. In some embodiments, a local parameter is characterized by a local posterior probability distribution associated with a local machine learning model. In some embodiments, a local parameter associated with a local machine learning model is updated as a result of fine-tuning the local machine learning model with a local dataset. In some embodiments, one or more local parameters are used to update global parameters associated with a global machine learning model.

In some embodiments, the term "local posterior probability distribution" refers to a data construct that describes a prediction output performance of a local machine learning model that has been fine-tuned based on in part on data features from a local dataset. Generally, a local posterior probability distribution may represent a likelihood of a local machine learning model correctly predicting a target classification and characterize one or more local parameters of the local machine learning model after fine-tuning. In some embodiments, each local machine learning model is independently fine-tuned with a local dataset at a given edge computing entity such that the local machine learning model generates local prediction outputs according to a local posterior probability distribution that is improved over an initial probability distribution or a global probability distribution.

In some embodiments, the term "local prediction output" refers to a data construct that describes an output generated by a local machine learning model comprising a prediction of a target classification from a local prediction dataset. In some embodiments, a local prediction output comprises a prediction accuracy characterized by a local posterior probability distribution associated with a local machine learning model.

II. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

A non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

A volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Example Framework

FIG. 1 is a schematic diagram of an example architecture 100 for optimizing predictive performance of machine learning models within an adaptive learning network. The architecture 100 includes a predictive data analysis system 101 configured to receive local parameters associated with local machine learning models from one or more edge computing entities 102 (hereinafter referred to as "edge computing entities 102"), process the local parameters to update a global machine learning model, and provide the updated global machine learning model to the edge computing entities 102, where each of the edge computing entities 102 may automatically initiate performance of prediction-based actions based on in part on the updated global machine learning model.

An example of a prediction-based action that can be performed using the edge computing entities 102 is flagging of data within an analyzed dataset and generating alerts and/or a report based on in part on the flagging of data. For example, in accordance with various embodiments of the present disclosure, a global machine learning model may be trained by aggregating local parameters from independent local machine learning models trained on local datasets to update global parameters of the global machine learning model. The global machine learning model with the updated global parameters may then be transmitted to the independent local machine learning models to propagate the collective learnings from each of the independent local machine learning models. Accordingly, embodiments of the present disclosure enable the edge computing entities 102 to build a common global machine learning model without sharing data, thus allowing to address critical issues, such as data privacy, data security, data access rights, and access to heterogeneous data. In doing so, the techniques described herein reduces the amount of data transferred over a network, thus reducing the number of computational operations needed and/or the amount of training data entries needed at a central computing entity 106 to train a global machine learning model. Accordingly, the techniques described herein improve the computational efficiency, storage-wise efficiency, and/or speed of training predictive machine learning models.

In some embodiments, predictive data analysis system 101 may communicate with at least one of the edge computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (e.g., network routers, and/or the like).

The predictive data analysis system 101 may include a central computing entity 106 and a storage subsystem 108. The central computing entity 106 may be configured to receive local parameters associated with local machine learning models from edge computing entities 102, process the local parameters to update a global machine learning model, and provide the updated global machine learning model to the edge computing entities 102.

The storage subsystem 108 may be configured to store input data used by the central computing entity 106 to model definition data used by the central computing entity 106 to perform various model training and predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Example Central Computing Entity 106

Figure 2:
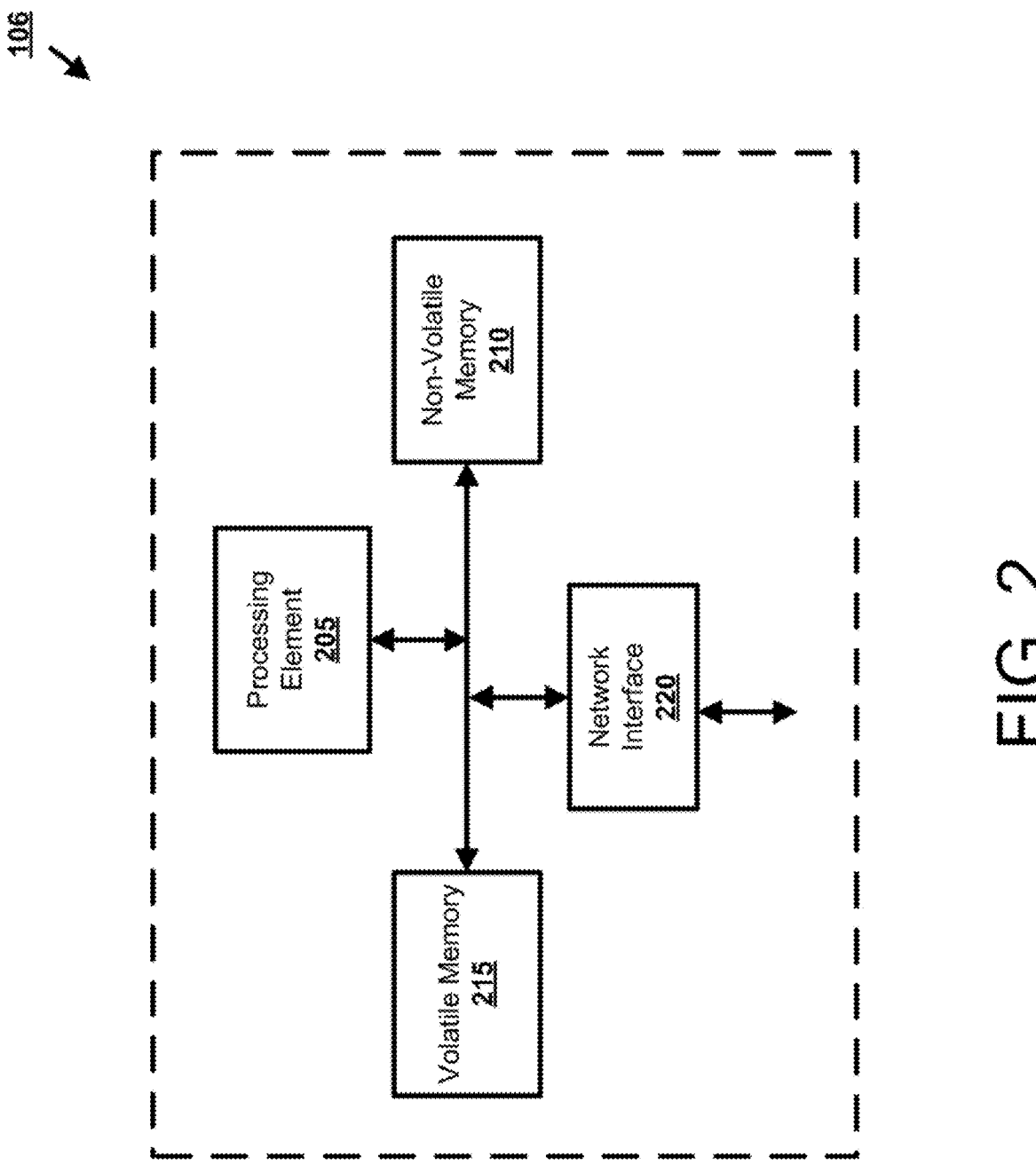
FIG. 2 provides a schematic of a central computing entity according to some embodiments of the present disclosure.

FIG. 2 provides a schematic of a central computing entity 106 according to some embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In some embodiments, these functions, operations, and/or processes can be performed on data, content, information, and/or similar terms used herein interchangeably.

As indicated, in some embodiments, the central computing entity 106 may also include one or more network interfaces 220 for communicating with various computing entities, such as by communicating data, content, information, and/or similar terms used herein interchangeably that can be transmitted, received, operated on, processed, displayed, stored, and/or the like.

As shown in FIG. 2, the central computing entity 106 may include, or be in communication with, one or more processing elements 205 (also referred to as processors, processing circuitry, and/or similar terms used herein interchangeably) that communicate with other elements within the central computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In some embodiments, the central computing entity 106 may further include, or be in communication with, non-volatile media (also referred to as non-volatile storage, memory, memory storage, memory circuitry and/or similar terms used herein interchangeably). In some embodiments, the non-volatile storage or memory may include one or more non-volatile memory 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In some embodiments, the central computing entity 106 may further include, or be in communication with, volatile media (also referred to as volatile storage, memory, memory storage, memory circuitry and/or similar terms used herein interchangeably). In some embodiments, the volatile storage or memory may also include one or more volatile memory 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the central computing entity 106 with the assistance of the processing element 205 and operating system.

As indicated, in some embodiments, the central computing entity 106 may also include one or more network interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the central computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the central computing entity 106 may include, or be in communication with, one or more input elements, such as a keyboard input, a mouse input, a touch screen/display input, motion input, movement input, audio input, pointing device input, joystick input, keypad input, and/or the like. The central computing entity 106 may also include, or be in communication with, one or more output elements (not shown), such as audio output, video output, screen/display output, motion output, movement output, and/or the like.

B. Example Edge Computing Entity 102

Figure 3:
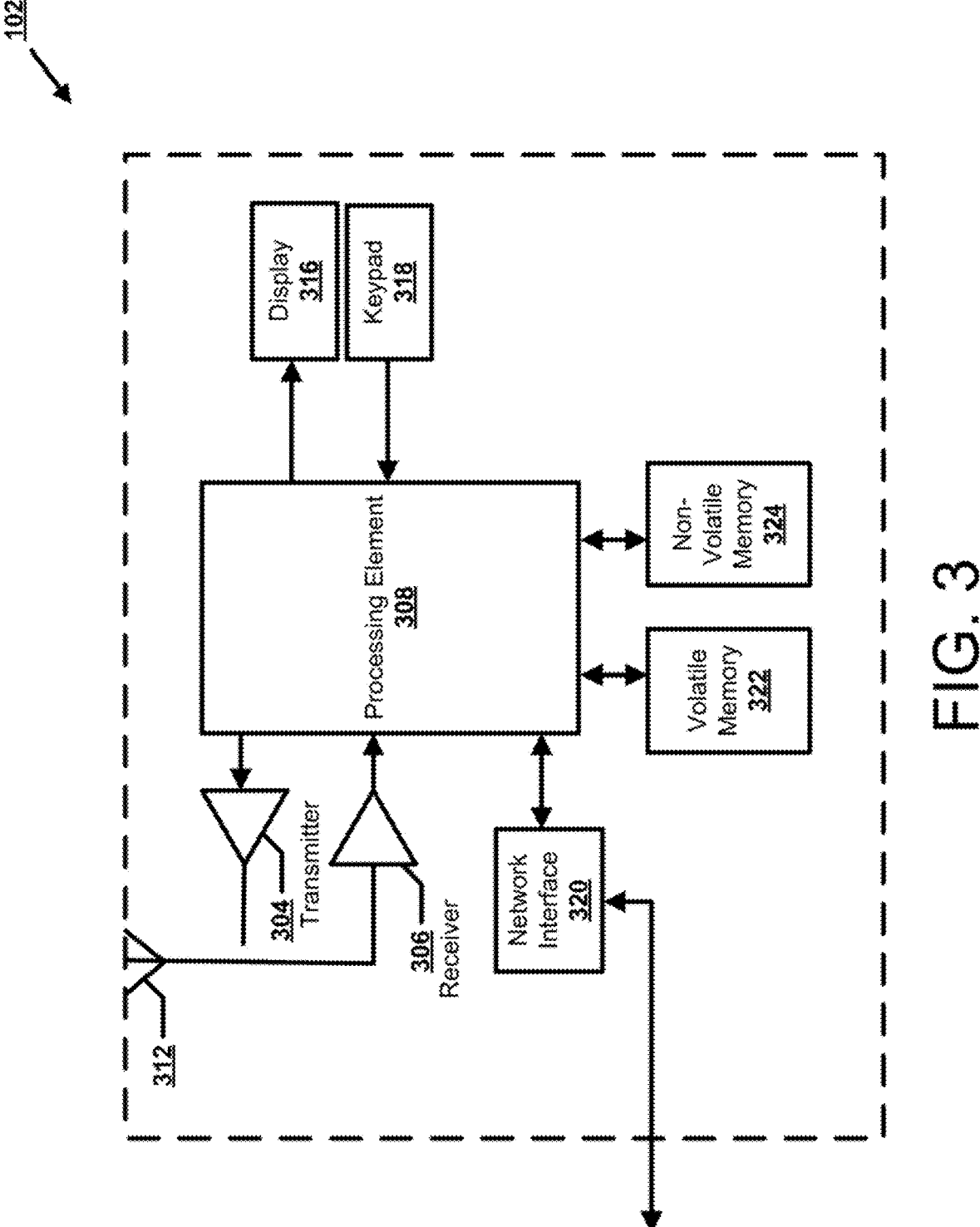
FIG. 3 provides an illustrative schematic representative of an edge computing entity 102 that can be used in conjunction with some embodiments of the present disclosure.

FIG. 3 provides an illustrative schematic representative of an edge computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Edge computing entities 102 can be operated by various parties. As shown in FIG. 3, the edge computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the edge computing entity 102 may be capable of operating with one or more air interface standards, communication protocols, modulation types, and access types. More particularly, the edge computing entity 102 may operate in accordance with any of a number of wireless communication standards and protocols, such as those described above with regard to the central computing entity 106. In some embodiments, the edge computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the edge computing entity 102 may operate in accordance with multiple wired communication standards and protocols, such as those described above with regard to the central computing entity 106 via a network interface 320.

Via these communication standards and protocols, the edge computing entity 102 can communicate with various other entities using mechanisms such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The edge computing entity 102 can also download changes, add-ons, and updates, for instance, to its firmware, software (e.g., including executable instructions, applications, program modules), and operating system.

According to some embodiments, the edge computing entity 102 may include location determining aspects, devices, modules, functionalities, and/or similar words used herein interchangeably. For example, the edge computing entity 102 may include outdoor positioning aspects, such as a location module adapted to acquire, for example, latitude, longitude, altitude, geocode, course, direction, heading, speed, universal time (UTC), date, and/or various other information/data. In some embodiments, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the position of the edge computing entity 102 in connection with a variety of other systems, including cellular towers, Wi-Fi access points, and/or the like. Similarly, the edge computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The edge computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the edge computing entity 102 to interact with and/or cause display of information/data from the central computing entity 106, as described herein. The user input interface can comprise any of a number of devices or interfaces allowing the edge computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the edge computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The edge computing entity 102 can also include volatile memory 322 and/or non-volatile memory 324, which can be embedded and/or may be removable. For example, the non-volatile memory 324 may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory 322 may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the edge computing entity 102. As indicated, this may include a user application that is resident on the entity or accessible through a browser or other user interface for communicating with the central computing entity 106 and/or various other computing entities.

In another embodiment, the edge computing entity 102 may include one or more components or functionality that are the same or similar to those of the central computing entity 106, as described in greater detail above. As will be recognized, these architectures and descriptions are provided for example purposes only and are not limiting to the various embodiments.

In various embodiments, the edge computing entity 102 may be embodied as an artificial intelligence (AI) computing entity, such as an Amazon Echo, Amazon Echo Dot, Amazon Show, Google Home, and/or the like. Accordingly, the edge computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

IV. Example System Operations

As described below, various embodiments of the present disclosure make important technical contributions to improving predictive accuracy of predictive machine learning models by performing continuous distributed learning on local datasets by local machine learning models and propagating the continuous distributed learnings across a network of edge computing entities without propagating data from the local datasets, which in turn improves training speed and training efficiency of training predictive machine learning models. It is well-understood in the relevant art that there is typically a tradeoff between predictive accuracy and training speed, such that it is trivial to improve training speed by reducing predictive accuracy. Thus, the real challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein the computational efficiency, storage-wise efficiency, and/or speed of training machine learning models.

Figure 4:
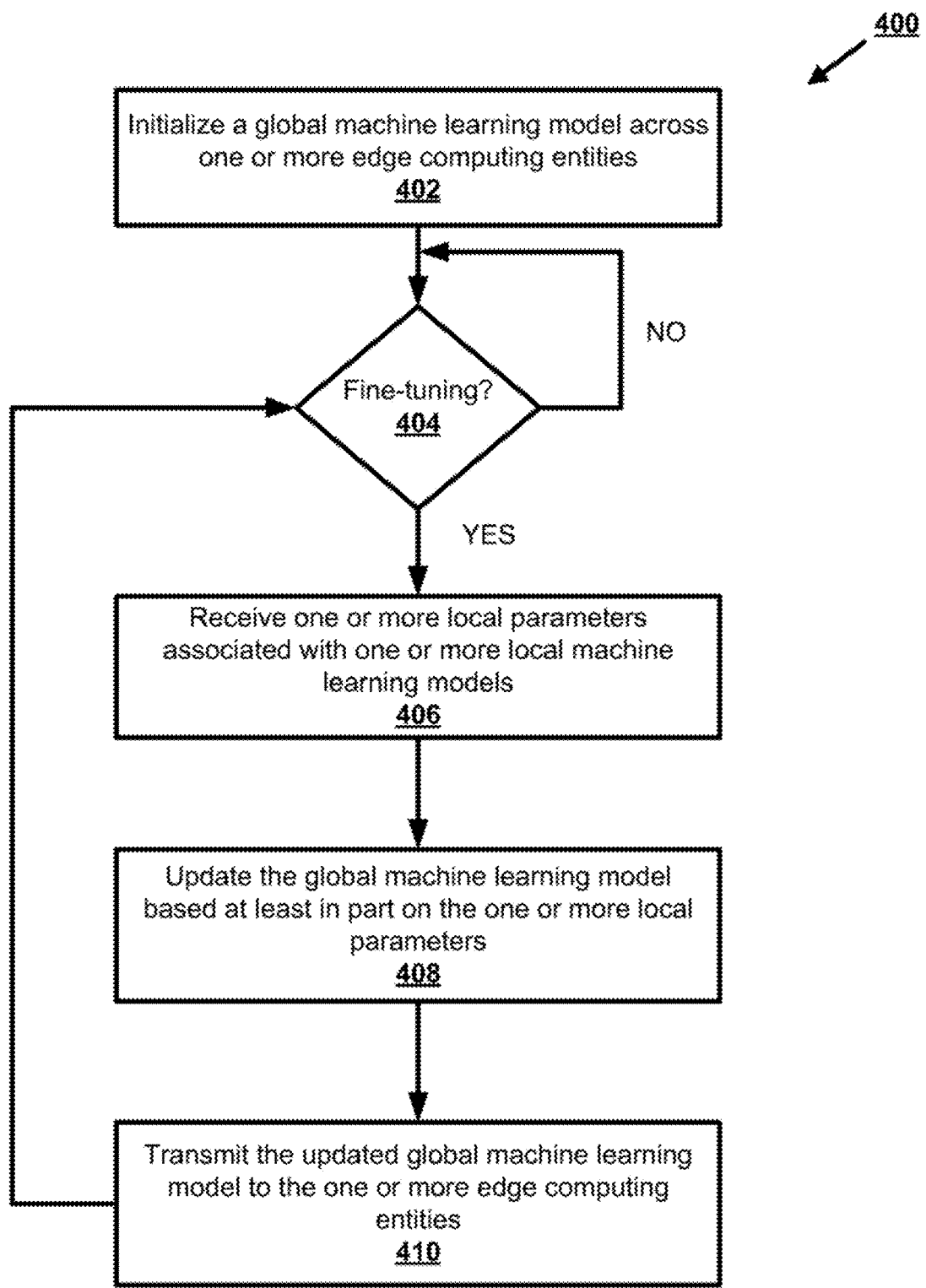
FIG. 4 is a flowchart diagram of an example process for optimizing predictive performance of machine learning models in accordance with some embodiments discussed herein.

FIG. 4 is a flowchart diagram of an example process 400 for optimizing predictive performance of machine learning models within an adaptive learning network based on in part on local parameters of local machine learning models associated with edge computing entities, such as edge computing entities 102.

In some embodiments, via the various steps/operations of the process 400, the central computing entity 106 processes the local parameters to update a global machine learning model and provide the updated global machine learning model to the edge computing entities (e.g., edge computing entities 102), where each of the edge computing entities 102 may automatically initiate performance of prediction-based actions based on in part on the updated global machine learning model.

In some embodiments, a global machine learning model is generated, trained, and maintained (e.g., updated) by a central computing entity 106 within an adaptive learning network. In some embodiments, a central computing entity 106 describes a computing entity, such as a cloud computing server or a data center. For example, a central computing entity 106 may comprise the predictive data analysis system 101 or be included in the predictive data analysis system 101, as illustrated in FIG. 1. A central computing entity 106 may be coupled to one or more edge computing entities (e.g., edge computing entities 102) via an adaptive learning network.

In some embodiments, a central computing entity 106 is configured to collect local machine learning model learnings (e.g., fine-tuning) from one or more edge computing entities to update a global machine learning model and share the learnings across the one or more edge computing entities via transmission of the updated global machine learning model. As such, the central computing entity 106 may perform federated or collaborative learning by training the global machine learning model through one or more edge computing entities that learn from local datasets, without having to transmit the local datasets themselves.

An edge computing entity 102 may be configured to fine-tune a local machine learning model based on in part on a local dataset, and share one or more local parameters of the local machine learning model reflecting the fine-tuning with a central computing entity 106 to improve a global machine learning model by updating the global machine learning model based on in part on the one or more local parameters. The global machine learning model may in turn be transmitted to other local machine learning models within an adaptive learning network such that the other local machine learning models may further improve on the global machine learning model with additional fine-tuning.

In some embodiments, the process 400 begins at step/operation 402 when the central computing entity 106 initializes a global machine learning model M(a_i, N) across one or more edge computing entities. The global machine learning model M may be pre-trained on a similar dataset of size N as available at the one or more edge computing entities $a_i \in N(\mu_i, \sigma_i^2)$, where $N(\mu_i, \sigma_i^2)$ is a parameter that is assumed to follow normal distribution comprising mean $\mu_i$ and variance $\sigma_i^2$ global parameters. In some embodiments, the global machine learning model may be initialized across the one or more edge computing entities by deploying the global machine learning model to each of the one or more edge computing entities, thereby establishing an instance of the global machine learning model as a local machine learning model at each of the one or more edge computing entities. In some embodiments, a global machine learning model describes parameters, hyperparameters, and/or defined operations of a machine learning model that is configured to generate initial prediction outputs. A global machine learning model may be pre-trained to generate one or more initial prediction outputs comprising an initial probability distribution representative of a likelihood (e.g., Bayesian) of correctly predicting a target classification based on in part on data features from an initial dataset. An initial probability distribution of a global machine learning model may result from pre-training using supervised and/or unsupervised machine learning to predict the target classification. In some embodiments, the initial probability distribution may be generated such that it is a conjugate prior of local posterior probability distributions associated with one or more local machine learning models that comprise an adaptive learning network.

In some embodiments, the predictive data analysis system 101 is used for anomaly detection and trains a global machine learning model to learn to predict a target classification. For example, the prediction data analysis system 101 may be trained to detect aberrant billing indicative of likely fraud, waste, abuse, and error (FWAE) across multiple disparate payer data sources. The one or more edge computing entities may be associated with distinct datasets representative of one or more payers. The initial probability distribution of the global machine learning model may comprise a probability distribution of a claims dataset that indicates the likelihood of a target classification (e.g., an FWAE event) or predicts the likelihood of the target classification.

In some embodiments, an initial prediction output describes an output generated by a global machine learning model comprising a prediction of a target classification from a prediction dataset. An initial prediction output may comprise a prediction accuracy characterized by an initial probability distribution associated with a global machine learning model.

In some embodiments, a probability distribution describes a prediction output performance of a machine learning model. A probability distribution may comprise a mathematical function that provides a plurality of probabilities of occurrence of an event associated with a target classification. A probability distribution may represent a likelihood of a machine learning model correctly predicting a target classification. A probability distribution may also characterize one or more parameters of a machine learning model.

In some embodiments, an initial probability distribution describes a prediction output performance of a pre-trained global machine learning model based on in part on an initial dataset. For example, an initial probability distribution may comprise a probability distribution of a global machine learning model prior to updating based on in part on one or more local parameters associated with one or more local machine learning models. In some embodiments, an initial probability distribution may comprise either a parametric distribution or a non-parametric distribution.

In some embodiments, a target classification describes a desired classification or prediction of features by a machine learning model. A machine learning model may be trained to generate prediction outputs comprising a target classification by learning features from a training dataset comprising examples of features associated with the target classification. As an example, a target classification may be representative of an event, and based on training data comprising examples of the event, a machine learning model may be configured to generate prediction outputs indicative of the occurrence of the event given a prediction dataset.

In some embodiments, at step/operation 404, the central computing entity 106 determines whether any of one or more local machine learning models have been fine-tuned using a local dataset. The global machine learning model may be continuously trained on local datasets at each of one or more edge computing entities.

In some embodiments, for every iteration that a local dataset is used to fine-tune any of the one or more local machine learning models, at step/operation 406, the central computing entity 106 receives one or more local parameters associated with one or more local machine learning models from one or more edge computing entities. Alternatively, when the number of edge computing entities are substantially large, local parameters may only be received from edge computing entities having local parameters with significant changes, e.g., that exceed a certain threshold. In some embodiments, Kullback-Leibler divergence or any other method to determine if a change in entropy/parameters is significant or not may be used to determine whether certain local parameters should be received by the central computing entity 106.

In some embodiments, a local parameter describes a configuration variable used by a local machine learning model to generate local prediction outputs. A local parameter may comprise a value or function that can be learned from training data by a local machine learning model by determining a mapping between input features from a local dataset and a target classification. For example, a local parameter may comprise a weight or bias associated with a local machine learning model.

In some embodiments, a local parameter may be characterized by a local posterior probability distribution associated with a local machine learning model. In some embodiments, a local posterior probability distribution describes a prediction output performance of a local machine learning model that has been fine-tuned based on in part on data features from a local dataset. Generally, a local posterior probability distribution may represent a likelihood of a local machine learning model correctly predicting a target classification and characterize one or more local parameters of the local machine learning model after fine-tuning.

In some embodiments, a local parameter associated with a local machine learning model may be updated as a result of fine-tuning the local machine learning model with a local dataset. Each local machine learning model may be independently fine-tuned with a local dataset at a given edge computing entity 102 such that the local machine learning model may generate local prediction outputs according to a local posterior probability distribution that is improved over an initial probability distribution or a global probability distribution. In some embodiments, a global probability distribution describes a prediction output performance of a global machine learning model. Generally, a global probability distribution may represent a likelihood of a global machine learning model correctly predicting a target classification and characterize one or more global parameters of the global machine learning model.

In some embodiments, fine-tuning a local machine learning model may comprise performing additional training on the local machine learning model using, for example, a local dataset comprising data that has not been previously observed by the local machine learning model. In some embodiments, fine-tuning may comprise using existing global parameters of the global machine learning model as starting values for the fine-tuning. In another embodiment, fine-tuning may comprise scoring of false positive and/or true positive rates based on in part on the initial probability distribution and labeled data from the local dataset.

In some embodiments, a global parameter describes a configuration variable used by a global machine learning model to generate prediction outputs. A global parameter may comprise a value or function that can be learned from training data by a global machine learning model by determining a mapping between input features from an initial dataset and a target classification. For example, a global parameter may comprise a weight or bias associated with a global machine learning model. A global parameter may be characterized by a global probability distribution associated with a global machine learning model.

In some embodiments, via performing step/operation 406, the central computing entity 106 aggregates learnings of local machine learning models via the one or more local parameters. Aggregation may be performed based on in part on determining a difference between one or more global parameters and the one or more local parameters received from the edge computing entities. The determined difference between the parameters may be weighted by the size of the dataset at each node (e.g., each computing entity). In some embodiments, the following algorithm may be employed to lessen the chance of spurious updates processed from any of the edge nodes (e.g., each computing entities) by the global machine learning model during aggregation:

--- upon receiving the updated parameters ($\mu_{ij}$, $\sigma_{ij}^2$, $n_j$ ) from edge computing entities;

For each edge computing entity $E_j$ j = 1 ... P;

compute: $\Delta\mu_{ij} = \dfrac{n_j}{N} * (\mu_i - \mu_{ij})$;

$\Delta\sigma_{ij}^2 = \dfrac{n_j}{N} * (\sigma_i^2 - \sigma_{ij}^2)i = 1 \ ... \ K.$

---

In some embodiments, according to the above algorithm, $n_j$ may represent validated data at edge computing entity j, $\Delta\mu_{ij}$ may represent a difference between global mean parameter $\mu_i$ and a local mean parameter $\mu_{ij}$, and $\Delta\sigma_{ij}^2$ may represent a difference between global variance parameter $\sigma_i^2$ and a local variance parameter $\sigma_{ij}^2$. Performing global aggregation may ensure that parameter information received from all edge computing entities is processed by the global machine learning model simultaneously such that evolving or new data feature patterns that are observed in any local machine learning model are incorporated into a new global machine learning model M'.

In some embodiments, at step/operation 408, the central computing entity 106 updates the global machine learning model based on in part on the one or more local parameters. According to various embodiments of the present disclosure, the received one or more local parameters associated with the one or more local machine learning models may be used to update one or more global parameters of a global machine learning model. For example, local datasets received at a given edge computing entity 102 may be used to fine-tune a local machine learning model such that the local machine learning model may generate prediction outputs according to a local posterior probability distribution that is improved over an initial probability distribution or a global probability distribution associated with the global machine learning model. As such, a global machine learning model may be updated based on in part on the fine-tuning of one or more local machine learning models via one or more local parameters of the one or more local machine learning models to converge on an optimal solution, minimizing prediction error over every iteration where new data from a local dataset has been learned from (e.g., by means the fine-tuning). Accordingly, a global machine learning model may be improved over iterations when a local machine learning model performs fine-tuning based on in part on a local dataset at a respective edge computing entity 102 coupled to the central computing entity 106 via an adaptive learning network.

However, as described herein, in accordance with various embodiments of the present disclosure, a global machine learning model may be trained by aggregating local parameters from independent local machine learning models trained on local datasets to update global parameters of the global machine learning model. A global machine learning model with the updated global parameters may be used to propagate the collective learnings across the adaptive learning network. Accordingly, embodiments of the present disclosure enable multiple edge computing devices to build a common global machine learning model without sharing data, thus allowing to address critical issues such as data privacy, data security, data access rights, and access to heterogeneous data. In doing so, the techniques described herein reduces the amount of data transferred over a network and, thus reducing the number of computational operations needed and/or the amount of training data entries needed at a central computing entity 106 to train a global machine learning model. Accordingly, the techniques described herein the computational efficiency, storage-wise efficiency, and/or speed of training predictive machine learning models.

In some embodiments, a learning rate may be applied to global parameters for new global machine learning model M' (as well as subsequent iterations) over the initial global machine learning model M (or previous global machine learning models). The learning rate may comprise a statistical delta selection function, such as at least one a of minimum, a maximum, a median, a mode, or a credible intervals delta selection function. The following algorithm may be used to determine updating of global parameters for new global machine learning model M':

$$\mu'_i = \mu_{i\,+}\,(\text{Min, Max, Median, Mode})(\Delta\mu_{ij});$$
$$\sigma'^2_i = \sigma_i^2 + (\text{Min, Max, Median, Mode})(\Delta\sigma_{ij}^2)^*,\, j = 1 \dots P;$$
New global machine learning model M'$(a_i,\, N + \Sigma n_j\,),\, j{=}1\, \dots P;$
where $a_i \in N(\mu'_i,\, \sigma'^2_i\,).$ In some embodiments, according to the above algorithm, $\mu'_i$ and $\sigma'^2_i$ may comprise global parameters for the new global machine learning model M', where $\mu'_i$ may represent an updated mean parameter and $\sigma'^2_i$ may represent an updated variance parameter.

In some embodiments, a credible intervals delta selection function of N $(\mu'_i,\, \sigma'^2_i)$ may be defined as a normal distribution with the smallest variance that covers the intersection of credible intervals, such as according to the following equation:

$$N\left(\mu'_i,\, \sigma'^2_i\right) = \bigcap_{j=1}^{p}\left(\mu_{ij} - c * \sigma_{ij}^2\right) \text{ to } \left(\mu_{ij} + c * \sigma_{ij}^2\right)$$

In some embodiments, a determination may be made to select a given one of minimum, maximum, median, mode, or credible intervals delta selection functions based on in part on a desired impact of each model update on the global parameters of an updated global machine learning model. For example, if an objective is to use a lower learning rate, then it may be optimal to choose a minimum delta amongst the edge computing entities as the criteria for aggregation. Similarly, if the objective is to use a higher learning rate, then it may be optimal to choose a maximum delta among the edge computing entities. Median and mode may be used if the most common delta amongst the edge computing entities are desired.

In some embodiments, at step/operation 410, the central computing entity 106 transmits the updated global machine learning model to the one or more edge computing entities. The updated global machine learning model may be provided (e.g., transmitted) to the one or more edge computing entities to propagate changes from the updated global machine learning model to the one or more local machine learning models associated with the one or more edge computing entities, thus propagating fine-tuning by each local machine learning model to other ones of the one or more local machine learning models throughout an adaptive learning network. The local machine learning model associated with each of the one or more edge computing entities may be updated based on in part on the updated global machine learning model. Each of the one or more edge computing entities may be configured to use an updated local machine learning model to generate a local prediction output, and initiate performance of one or more prediction-based actions based on in part on the local prediction output. In some embodiments, a prediction dataset may be provided to a local machine learning model to generate a prediction output comprising one or more classifications of data in the prediction dataset with respect to a target classification, and the performance of the prediction-based actions are initiated based on in part on the one or more classifications. In some embodiments, initiating performance of the one or more prediction-based actions based on in part on the local prediction output includes displaying one or more classifications using a prediction output user interface. The process 400 may return to step/operation 404 to determine whether more fine-tuning has been performed. With every new iteration, the steps/operations 406 to 410 may be repeated based on in part on the local machine learning models observing new data in each subsequent iteration.

Figure 5:
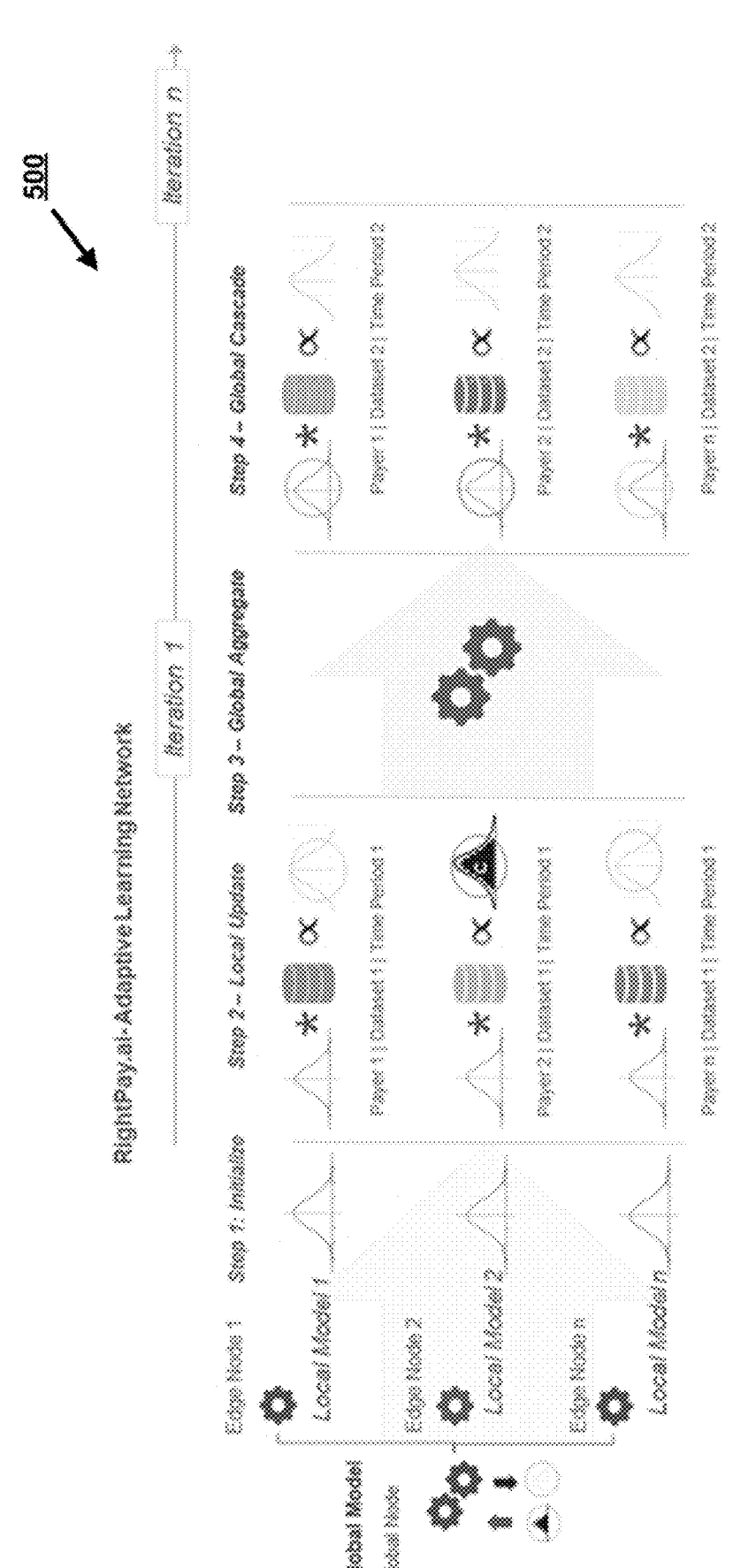
FIG. 5 is an operational example of adaptive learning network in accordance with some embodiments discussed herein.

An operational example of adaptive learning network 500 is depicted in FIG. 5. As depicted in FIG. 5, in some embodiments, a global machine learning model may be initialized at a central computing entity 106 and deployed as local instances of the global machine learning model (e.g., local machine learning models) at a plurality of edge computing entities. Moreover, as further depicted in FIG. 5, in some embodiments, local updates to the local machine learning models may be performed independently at each edge computing entities. The local updates may be aggregated and used to update the global machine learning model at the central computing entity 106. The updated global machine learning model may then be redeployed to the edge computing entities, replacing the local machine learning models with the updated global machine learning model.

Figure 6:
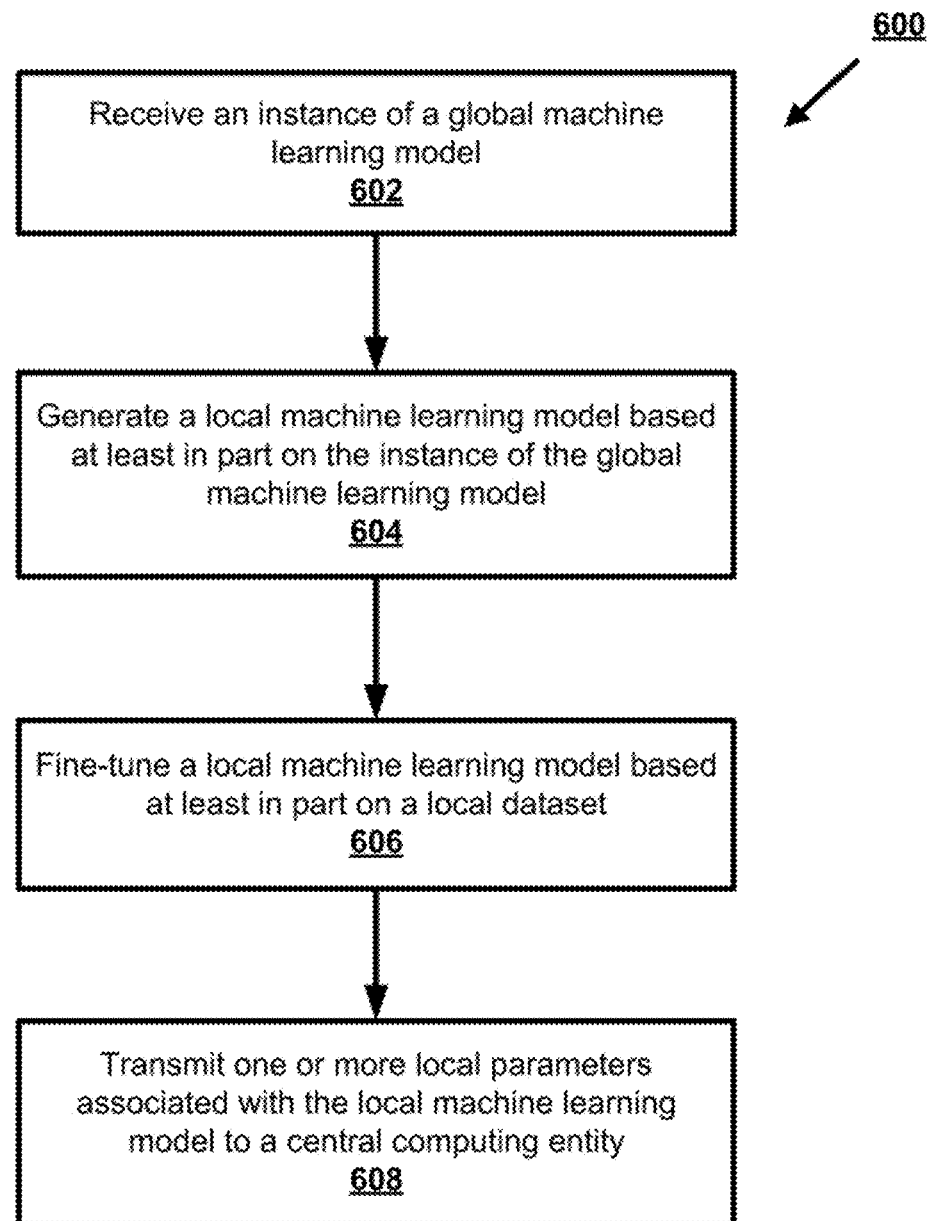
FIG. 6 is a flowchart diagram of an example process for updating a local machine learning model by an edge computing entity within an adaptive learning network in accordance with some embodiments discussed herein.

FIG. 6 is a flowchart diagram of an example process 600 for updating a local machine learning model by an edge computing entity 102 within an adaptive learning network. Via the various steps/operations of the process 600, the edge computing entity 102 may be configured to learn from local datasets, without having to transmit the local datasets themselves, and share learnings across an adaptive learning network.

In some embodiments, the process 600 begins at step/operation 602 when the edge computing entity 102 receives an instance of a global machine learning model from a central computing entity 106. The instance of the global machine learning model may comprise an initialized model that is pre-trained to generate one or more initial prediction outputs comprising an initial probability distribution representative of a likelihood (e.g., Bayesian) of correctly predicting a target classification based on in part on data features from an initial dataset. Alternatively, the instance of the global machine learning model may comprise an updated model global machine learning model that has been updated based on in part on fine-tuning of one or more local machine learning models associated with one or more edge computing entities within an adaptive learning network. The global machine learning model may be deployed across a plurality of edge computing entities (e.g., including edge computing entity 102) within the adaptive learning network.

In some embodiments, at step/operation 604, the edge computing entity 102 generates a local machine learning model based on in part on the instance of the global machine learning model.

In some embodiments, at step/operation 606, the edge computing entity 102 fine-tunes the local machine learning model based on in part on a local dataset. The edge computing entity 102 may fine-tune the local machine learning model to impart learnings observed from the local dataset to existing learnings from the instance of the global machine learning model. Fine-tuning may comprise performing training on the local machine learning model using, for example, the local dataset comprising data that has not been previously observed by the local machine learning model. In some embodiments, fine-tuning may comprise using existing global parameters of the global machine learning model as starting values for the fine-tuning. In another embodiment, fine-tuning may comprise scoring of false positive and/or true positive rates based on in part on the initial probability distribution and labeled data from the local dataset.

In some embodiments, fine-tuning the local machine learning model may comprise calibrating the local machine learning model by determining a probability distribution based on in part on a global probability distribution and accordingly updating the probability distribution to obtain a local posterior probability distribution that minimizes prediction error.

In some embodiments, at step/operation 608, the edge computing entity 102 transmits one or more local parameters associated with the local machine learning model to a central computing entity 106. In some embodiments, providing the one or more local parameters may be performed according to the following algorithm:

For each computing entity j ; j = 1 ... ... ... P, DO {
$M_{new}(a_{ij}, N + nj)$ = validated data * $M(a_i, N)$, nj = |validated data at computing entity j|;
$a_{ij} \in N(\mu_{ij}, \sigma_{ij}^2)$, i = 1 ... K;
send updated parameters ($\mu_{ij}, \sigma_{ij}^2$, nj ) to Global Model}.

In some embodiments, the provided one or more local parameters may be provided (e.g., transmitted) to the central computing entity 106. The central computing entity 106 may update a global machine learning model and provide the updated global machine learning model to edge computing entities within an adaptive learning network.

Accordingly, as described above, various embodiments of the present disclosure make important technical contributions to improving predictive accuracy of predictive machine learning models by performing continuous distributed learning on local datasets by local machine learning models and propagating the continuous distributed learnings across a network of edge computing entities without propagating data from the local datasets, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures. Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve the computational efficiency, storage-wise efficiency, and/or speed of training machine learning models.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VI. Examples

Example 1. A computer-implemented method comprising: initializing, by one or more processors, a global machine learning model across one or more edge computing entities by deploying the global machine learning model to each of the one or more edge computing entities as a local machine learning model, wherein the global machine learning model has been pre-trained to generate one or more initial prediction outputs comprising an initial probability distribution representative of a likelihood of correctly predicting a target classification based on data features from an initial dataset; receiving, by the one or more processors, one or more local parameters associated with the local machine learning model, wherein i) the one or more local parameters are characterized by a local posterior probability distribution associated with the local machine learning model, and ii) the local posterior probability distribution comprises prediction output performance based on data features from a local dataset at the one or more edge computing entities, updating, by the one or more processors, the global machine learning model based on the one or more local parameters, and providing, by the one or more processors, the updated global machine learning model to the one or more edge computing entities for updating the local machine learning model, causing each of the one or more edge computing entities to: i) use the updated local machine learning model to generate a local prediction output, and ii) initiate performance of one or more prediction-based actions based on the local prediction output.

Example 2. The computer-implemented method of example 1, wherein the global machine learning model is trained using at least one of supervised machine learning or unsupervised machine learning to predict the target classification.

Example 3. The computer-implemented method of example 1 or 2, wherein updating the local machine learning model comprises scoring of false positive and/or true positive rates based on the initial probability distribution and labeled data from the local dataset.

Example 4. The computer-implemented method of any of the preceding examples further comprising updating, by the one or more processors, the global machine learning model by updating global parameters associated with the global machine learning model based on the one or more local parameters.

Example 5. The computer-implemented method of any of the preceding examples further comprising applying, by the one or more processors, a learning rate to the one or more local parameters.

Example 6. The computer-implemented method of example 5, wherein the learning rate comprises a delta selection function of the one or more local parameters.

Example 7. The computer-implemented method of example 6, wherein the learning rate comprises a delta selection function of the one or more local parameters.

Example 8. The computer-implemented method of example 7, wherein the delta selection function comprises a function selected from the group consisting of a minimum, maximum, median, mode, and credible intervals.

Example 9. The computer-implemented method of any of examples 4 through 8 further comprising: determining, by the one or more processors, a difference between the global parameters and the one or more local parameters; and updating, by the one or more processors, the global parameters based on the difference.

Example 10. The computer-implemented method of example 9 further comprising: determining, by the one or more processors, a weight of the difference based on a size of the local dataset; and updating, by the one or more processors, the global parameters based on the difference and the determined weight.

Example 11. The computer-implemented method of any of the preceding examples wherein the one or more local parameters comprise at least one of mean or variance of the local posterior probability distribution.

Example 12. The computer-implemented method of any of the preceding examples further comprising receiving the one or more local parameters, updating the global machine learning model, and providing the updated global machine learning model for every iteration that the local dataset is used at the one or more edge computing entities to fine-tune the local machine learning model.

Example 13. A computing apparatus comprising one or more processors and memory including program code, the memory and the program code configured to, when executed by the one or more processors, cause the computing apparatus to: initialize a global machine learning model across one or more edge computing entities by deploying the global machine learning model to each of the one or more edge computing entities as a local machine learning model, wherein the global machine learning model has been pre-trained to generate one or more initial prediction outputs comprising an initial probability distribution representative of a likelihood of correctly predicting a target classification based on data features from an initial dataset; receive one or more local parameters associated with the local machine learning model, wherein i) the one or more local parameters are characterized by a local posterior probability distribution associated with the local machine learning model, and ii) the local posterior probability distribution comprises prediction output performance based on data features from a local dataset at the one or more edge computing entities, update the global machine learning model based on the one or more local parameters, and provide the updated global machine learning model to the one or more edge computing entities for updating the local machine learning model, causing each of the one or more edge computing entities to: i) use the updated local machine learning model to generate a local prediction output, and ii) initiate performance of one or more prediction-based actions based on the local prediction output.

Example 14. The computing apparatus of example 13, wherein the global machine learning model is trained using at least one of supervised machine learning or unsupervised machine learning to predict the target classification.

Example 15. The computing apparatus of example 13 or 14, wherein updating the local machine learning model comprises scoring of false positive and/or true positive rates based on the initial probability distribution and labeled data from the local dataset.

Example 16. The computing apparatus of any of examples 13 through 15 further caused to update the global machine learning model by updating global parameters associated with the global machine learning model based on the one or more local parameters.

Example 17. The computing apparatus of any of examples 13 through 16 further caused to apply a learning rate to the one or more local parameters.

Example 18. The computing apparatus of example 17, wherein the learning rate comprises a delta selection function of the one or more local parameters.

Example 19. The computing apparatus of example 18, wherein the learning rate comprises a delta selection function of the one or more local parameters.

Example 20. The computing apparatus of example 19, wherein the delta selection function comprises a function selected from the group consisting of a minimum, maximum, median, mode, and credible intervals.

Example 21. The computing apparatus of any of examples 16 through 20 further caused to: determine a difference between the global parameters and the one or more local parameters; and update the global parameters based on the difference.

Example 22. The computing apparatus of example 21 further caused to: determine a weight of the difference based on a size of the local dataset; and update the global parameters based on the difference and the determined weight.

Example 23. The computing apparatus of examples 13 through 22, wherein the one or more local parameters comprise at least one of mean or variance of the local posterior probability distribution.

Example 24. The computing apparatus of any of examples 13 through 23 further caused to receive the one or more local parameters, update the global machine learning model, and provide the updated global machine learning model for every iteration that the local dataset is used at the one or more edge computing entities to fine-tune the local machine learning model.

Example 25. A computer program product comprising a non-transitory computer-readable storage medium, the non-transitory computer-readable storage medium including instructions that, when executed by one or more processors, cause the one or more processors to: initialize a global machine learning model across one or more edge computing entities by deploying the global machine learning model to each of the one or more edge computing entities as a local machine learning model, wherein the global machine learning model has been pre-trained to generate one or more initial prediction outputs comprising an initial probability distribution representative of a likelihood of correctly predicting a target classification based on data features from an initial dataset; receive one or more local parameters associated with the local machine learning model, wherein i) the one or more local parameters are characterized by a local posterior probability distribution associated with the local machine learning model, and ii) the local posterior probability distribution comprises prediction output performance based on data features from a local dataset at the one or more edge computing entities, update the global machine learning model based on the one or more local parameters, and provide the updated global machine learning model to the one or more edge computing entities for updating the local machine learning model, causing each of the one or more edge computing entities to: i) use the updated local machine learning model to generate a local prediction output, and ii) initiate performance of one or more prediction-based actions based on the local prediction output.

Example 26. The computer program product of example 25, wherein the global machine learning model is trained using at least one of supervised machine learning or unsupervised machine learning to predict the target classification.

Example 27. The computer program product of example 25 or 26, wherein updating the local machine learning model comprises scoring of false positive and/or true positive rates based on the initial probability distribution and labeled data from the local dataset.

Example 28. The computer program product of any of examples 25 through 27 further comprising instructions that, when executed by the one or more processors, cause the one or more processors to update the global machine learning model by updating global parameters associated with the global machine learning model based on the one or more local parameters.

Example 29. The computer program product of any of examples 25 through 28 further comprising instructions that, when executed by the one or more processors, cause the one or more processors to apply a learning rate to the one or more local parameters.

Example 30. The computer program product of example 29, wherein the learning rate comprises a delta selection function of the one or more local parameters.

Example 31. The computer program product of example 30, wherein the learning rate comprises a delta selection function of the one or more local parameters.

Example 32. The computer program product of example 31, wherein the delta selection function comprises a function selected from the group consisting of a minimum, maximum, median, mode, and credible intervals.

Example 33. The computer program product of any of examples 28 through 32, further comprising instructions that, when executed by the one or more processors, cause the one or more processors to: determine a difference between the global parameters and the one or more local parameters; and update the global parameters based on the difference.

Example 34. The computer program product of example 33 further comprising instructions that, when executed by the one or more processors, cause the one or more processors to: determine a weight of the difference based on a size of the local dataset; and update the global parameters based on the difference and the determined weight.

Example 35. The computer program product of any of examples 25 through 34 wherein the one or more local parameters comprise at least one of mean or variance of the local posterior probability distribution.

Example 36. The computer program product of any of examples 25 through 35 further comprising instructions that, when executed by the one or more processors, cause the one or more processors to receive the one or more local parameters, update the global machine learning model, and provide the updated global machine learning model for every iteration that the local dataset is used at the one or more edge computing entities to fine-tune the local machine learning model.

Example 37. A computer-implemented method comprising: receiving, by one or more processors, a global machine learning model from a global computing entity as a local machine learning model, wherein the global machine learning model has been pre-trained to generate one or more initial prediction outputs comprising an initial probability distribution representative of a likelihood of correctly predicting a target classification based on data features from an initial dataset; providing, by the one or more processors, one or more local parameters associated with the local machine learning model to the global computing entity, wherein i) the one or more local parameters are characterized by a local posterior probability distribution associated with the local machine learning model, and ii) the local posterior probability distribution comprises prediction output performance based on data features from a local dataset at the one or more edge computing entities; receiving, by the one or more processors, an updated global machine learning model from the global computing entity, wherein the updated global machine learning mode is updated based on the one or more local parameters; updating, by the one or more processors, the local machine learning model; generating, by the one or more processors, a local prediction output based on the updated local machine learning model; and initiating, by the one or more processors, performance of one or more prediction-based actions based on the local prediction output.

Example 38. The computer-implemented method of example 37, wherein the global machine learning model is trained using at least one of supervised machine learning or unsupervised machine learning to predict the target classification.

Example 39. The computer-implemented method of example 37 or 38, wherein updating the local machine learning model further comprises: scoring, by the one or more processors, false positive and/or true positive rates based on the initial probability distribution and labeled data from the local dataset.

Example 40. The computer-implemented method of any of examples 37 through 39 further comprising applying, by the one or more processors, a learning rate to the one or more local parameters.

Example 41. The computer-implemented method of example 40, wherein the learning rate comprises a delta selection function of the one or more local parameters.

Example 42. The computer-implemented method of example 40, wherein the delta selection function comprises a function selected from the group consisting of a minimum, maximum, median, mode, and credible intervals.

Example 43. The computer-implemented method of any of examples 37 through 42, wherein the one or more local parameters comprise at least one of mean or variance of the local posterior probability distribution.

Example 44. A computing apparatus comprising one or more processors and memory including program code, the memory and the program code configured to, when executed by the one or more processors, cause the computing apparatus to: receive a global machine learning model from a global computing entity as a local machine learning model, wherein the global machine learning model has been pre-trained to generate one or more initial prediction outputs comprising an initial probability distribution representative of a likelihood of correctly predicting a target classification based on data features from an initial dataset; provide one or more local parameters associated with the local machine learning model to the global computing entity, wherein i) the one or more local parameters are characterized by a local posterior probability distribution associated with the local machine learning model, and ii) the local posterior probability distribution comprises prediction output performance based on data features from a local dataset at the one or more edge computing entities; receive an updated global machine learning model from the global computing entity, wherein the updated global machine learning mode is updated based on the one or more local parameters; update the local machine learning model; generate a local prediction output based on the updated local machine learning model; and initiate performance of one or more prediction-based actions based on the local prediction output.

Example 45. The computing apparatus of example 44, wherein the global machine learning model is trained using at least one of supervised machine learning or unsupervised machine learning to predict the target classification.

Example 46. The computing apparatus of example 44 or 45 further caused to score false positive and/or true positive rates based on the initial probability distribution and labeled data from the local dataset.

Example 47. The computing apparatus of any of examples 44 through 46 further
caused to apply a learning rate to the one or more local parameters.

Example 48. The computing apparatus of example 47, wherein the learning rate comprises a delta selection function of the one or more local parameters.

Example 49. The computing apparatus of example 47, wherein the delta selection function comprises a function selected from the group consisting of a minimum, maximum, median, mode, and credible intervals.

Example 50. The computing apparatus of any of examples 44 through 49, wherein the one or more local parameters comprise at least one of mean or variance of the local posterior probability distribution.

Example 51. A computer program product comprising a non-transitory computer-readable storage medium, the non-transitory computer-readable storage medium including instructions that, when executed by one or more processors, cause the one or more processors to: receive a global machine learning model from a global computing entity as a local machine learning model, wherein the global machine learning model has been pre-trained to generate one or more initial prediction outputs comprising an initial probability distribution representative of a likelihood of correctly predicting a target classification based on data features from an initial dataset; provide one or more local parameters associated with the local machine learning model to the global computing entity, wherein i) the one or more local parameters are characterized by a local posterior probability distribution associated with the local machine learning model, and ii) the local posterior probability distribution comprises prediction output performance based on data features from a local dataset at the one or more edge computing entities; receive an updated global machine learning model from the global computing entity, wherein the updated global machine learning mode is updated based on the one or more local parameters; update the local machine learning model; generate a local prediction output based on the updated local machine learning model; and initiate performance of one or more prediction-based actions based on the local prediction output.

Example 52. The computer program product of example 51, wherein the global machine learning model is trained using at least one of supervised machine learning or unsupervised machine learning to predict the target classification.

Example 53. The computer program product of example 51 or 52 further comprising instructions that, when executed by the one or more processors, cause the one or more processors to score false positive and/or true positive rates based on the initial probability distribution and labeled data from the local dataset.

Example 54. The computer program product of any of examples 51 through 53 further comprising instructions that, when executed by the one or more processors, cause the one or more processors to apply a learning rate to the one or more local parameters.

Example 55. The computer program product of example 54, wherein the learning rate comprises a delta selection function of the one or more local parameters.

Example 56. The computer program product of example 54, wherein the delta selection function comprises a function selected from the group consisting of a minimum, maximum, median, mode, and credible intervals.

Example 57. The computer program product of any of examples 51 through 56, wherein the one or more local parameters comprise at least one of mean or variance of the local posterior probability distribution.

The invention claimed is:

1. A computer-implemented method comprising:
initializing, by one or more processors, a global machine learning model across a plurality of edge computing entities by deploying the global machine learning model to the plurality of edge computing entities as a local machine learning model, wherein the global machine learning model has been pre-trained to generate an initial prediction output comprising an initial probability distribution representative of a likelihood of correctly predicting a target classification based on data features from an initial dataset;
receiving, by the one or more processors, a plurality of local parameters associated with the local machine learning model, wherein i) the plurality of local parameters are characterized by a local posterior probability distribution associated with the local machine learning model, and ii) the local posterior probability distribution comprises prediction output performance based on data features from a local dataset at the plurality of edge computing entities;
updating, by the one or more processors, the global machine learning model by applying a learning rate to the plurality of local parameters, wherein (i) the learning rate comprises a delta selection function of the one or more local parameters and (ii) the delta selection function comprises one of a minimum function, a maximum function, a median function, a mode function or credible intervals delta selection function; and
providing, by the one or more processors, the updated global machine learning model to the plurality of edge computing entities for updating the local machine learning model, causing an edge computing entity of the plurality of edge computing entities to:
i) use the updated local machine learning model to generate a local prediction output, and
ii) initiate performance of one or more prediction-based actions based on the local prediction output.
2. The computer-implemented method of claim 1, wherein the global machine learning model is trained using at least one of supervised machine learning or unsupervised machine learning to predict the target classification.

3. The computer-implemented method of claim 1, wherein updating the local machine learning model comprises scoring of false positive rates or true positive rates based on the initial probability distribution and labeled data from the local dataset.

4. The computer-implemented method of claim 1 further comprising updating, by the one or more processors, the global machine learning model by updating global parameters associated with the global machine learning model based on the plurality of local parameters.

5. The computer-implemented method of claim 4 further comprising:

determining, by the one or more processors, a difference between the global parameters and the plurality of local parameters; and updating, by the one or more processors, the global parameters based on the difference.

6. The computer-implemented method of claim 5 further comprising:

determining, by the one or more processors, a weight of the difference based on a size of the local dataset; and updating, by the one or more processors, the global parameters based on the difference and the weight.

7. The computer-implemented method of claim 1, wherein the plurality of local parameters comprise at least one of mean or variance of the local posterior probability distribution.

8. A system comprising:

one or more processors; and at least one memory storing processor-executable instructions that, when executed by the one or more processors, cause the one or more processors to:

initialize a global machine learning model across a plurality of edge computing entities by deploying the global machine learning model to the plurality of edge computing entities as a local machine learning model, wherein the global machine learning model has been pre-trained to generate an initial prediction output comprising an initial probability distribution representative of a likelihood of correctly predicting a target classification based on data features from an initial dataset;

receive a plurality of local parameters associated with the local machine learning model, wherein i) the plurality of local parameters are characterized by a local posterior probability distribution associated with the local machine learning model, and ii) the local posterior probability distribution comprises prediction output performance based on data features from a local dataset at the plurality of edge computing entities;

update the global machine learning model by applying a learning rate to the plurality of local parameters, wherein (i) the learning rate comprises a delta selection function of the plurality of local parameters and (ii) the delta selection function comprises one of a minimum function, a maximum function, a median function, a mode function or credible intervals delta selection function; and provide the updated global machine learning model to the plurality of edge computing entities for updating the local machine learning model, causing an edge computing entity of the plurality of edge computing entities to:

i) use the updated local machine learning model to generate a local prediction output, and ii) initiate performance of one or more prediction-based actions based on the local prediction output.

9. The system of claim 8, wherein updating the local machine learning model comprises scoring of false positive rates or true positive rates based on the initial probability distribution and labeled data from the local dataset.

10. The system of claim 8, wherein the one or more processors are further caused to update the global machine learning model by the global machine learning model by updating global parameters associated with the global machine learning model based on the plurality of local parameters.

11. The system of claim 10, wherein the one or more processors are further caused to apply a learning rate to the plurality of local parameters.

12. The system of claim 10, wherein the one or more processors are is further caused to:

determine a difference between the global parameters and the plurality of local parameters; and update the global parameters based on the difference.

13. The system of claim 12, wherein the one or more processors are further caused to:

determine a weight of the difference based on a size of the local dataset; and update the global parameters based on the difference and the weight.

14. One or more non-transitory computer-readable storage media including instructions that, when executed by one or more processors, cause the one or more processors to:

initialize a global machine learning model across a plurality of edge computing entities by deploying the global machine learning model to the plurality of edge computing entities as a local machine learning model, wherein the global machine learning model has been pre-trained to generate an initial prediction output comprising an initial probability distribution representative of a likelihood of correctly predicting a target classification based on data features from an initial dataset;

receive a plurality of local parameters associated with the local machine learning model, wherein i) the plurality of local parameters are characterized by a local posterior probability distribution associated with the local machine learning model, and ii) the local posterior probability distribution comprises prediction output performance based on data features from a local dataset at the plurality of edge computing entities;

update the global machine learning model by applying a learning rate to the plurality of local parameters, wherein (i) the learning rate comprises a delta selection function of the plurality of local parameters and (ii) the delta selection function comprises one of a minimum function, a maximum function, a median function, a mode function, or credible intervals delta selection function; and provide the updated global machine learning model to the plurality of edge computing entities for updating the local machine learning model, causing an edge computing entity of the plurality of edge computing entities to:

i) use the updated local machine learning model to generate a local prediction output, and ii) initiate performance of one or more prediction-based actions based on the local prediction output.

15. The one or more non-transitory computer-readable storage media of claim 14, wherein the instructions further cause the one or more processors to update the global machine learning model by updating global parameters associated with the global machine learning model based on the plurality of local parameters.

16. The one or more non-transitory computer-readable storage media of claim 15, wherein the instructions further cause the one or more processors to:

determine a difference between the global parameters and the one or more local parameters; and update the global parameters based on the difference.

17. The one or more non-transitory computer-readable storage media of claim 16, wherein the instructions further cause the one or more processors to:

determine a weight of the difference based on a size of the local dataset; and update the global parameters based on the difference and the weight.

18. A computer-implemented method comprising:

receiving, by one or more processors, a global machine learning model from a global computing entity as a local machine learning model, wherein the global machine learning model has been pre-trained to generate an initial prediction output comprising an initial probability distribution representative of a likelihood of correctly predicting a target classification based on data features from an initial dataset;

providing, by the one or more processors, a plurality of local parameters associated with the local machine learning model to the global computing entity, wherein i) the plurality of local parameters are characterized by a local posterior probability distribution associated with the local machine learning model, and ii) the local posterior probability distribution comprises prediction output performance based on data features from a local dataset at a plurality of edge computing entities;

receiving, by the one or more processors, an updated global machine learning model from the global computing entity, wherein the updated global machine learning model is updated by applying a learning rate to the plurality of local parameters, wherein (i) the learning rate comprises a delta selection function of the plurality of local parameters and (ii) the delta selection function comprises one of a minimum function, a maximum function, a median function, a mode function or credible intervals delta selection function;

updating, by the one or more processors, the local machine learning model;

generating, by the one or more processors, a local prediction output based on the updated local machine learning model; and initiating, by the one or more processors, performance of one or more prediction-based actions based on the local prediction output.

19. The computer-implemented method of claim 18, wherein the global machine learning model is trained using at least one of supervised machine learning or unsupervised machine learning to predict the target classification.

20. The computer-implemented method of claim 18, wherein updating the local machine learning model further comprises: scoring, by the one or more processors, false positive rates or true positive rates based on the initial probability distribution and labeled data from the local dataset.

21. The computer-implemented method of claim 18, wherein the plurality of local parameters comprise at least one of mean or variance of the local posterior probability distribution.

* * * * *